United States Patent [19]

Wurmb et al.

[11] 4,092,463

[45] May 30, 1978

[54] SECONDARY BATTERY

[75] Inventors: Rolf Wurmb, Heidelberg; Fritz Beck; Klaus Boehlke, both of Ludwigshafen, all of Germany

[73] Assignee: BASF Aktiengesellschaft, Ludwigshafen, Germany

[21] Appl. No.: 703,957

[22] Filed: Jul. 9, 1976

[30] Foreign Application Priority Data

Jul. 21, 1975 Germany .............................. 2532512

[51] Int. Cl.$^2$ .......................................... H01M 10/38
[52] U.S. Cl. .................................... 429/105; 429/107
[58] Field of Search ............... 429/105, 107, 204, 218, 429/221, 225, 228, 12, 15, 19, 27, 29, 46

[56] References Cited

U.S. PATENT DOCUMENTS 3,540,933  11/1970  Boeke ............................ 429/105 X Primary Examiner—Anthony Skapars
Attorney, Agent, or Firm—Keil, Thompson & Shurtleff

[57] ABSTRACT

Secondary batteries with aqueous acid solutions of lead salts as electrolytes and inert electrode base plates also contain redox systems in solution. These systems have a standard potential of from $-0.1$ to $+1.4$ V relative to a standard hydrogen reference electrode, do not form insoluble compounds with the electrolytes and are not oxidized or reduced irreversibly by the active compositions applied to the electrode base plates, within their range of operating potentials.

8 Claims, 5 Drawing Figures

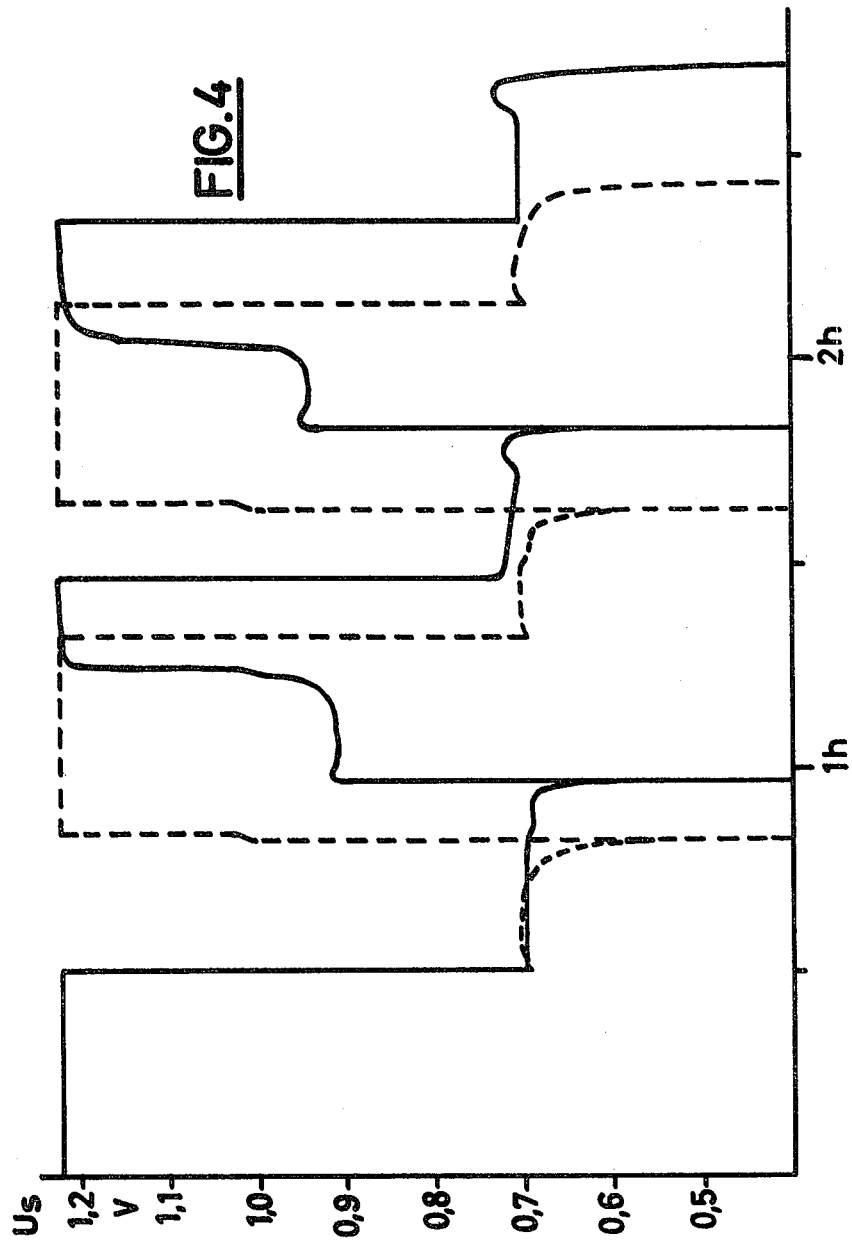

SECONDARY BATTERY

Most conventional secondary batteries contain electrodes of the second kind, in the case of which the discharge products are insoluble in the electrolyte and remain in the porous structure of the electrode material. Typical examples of such electrodes are $Pb/PbSO_4/H_2SO_4$, $Cd/Cd(OH)_2/KOH$ and $NiOOH/Ni(OH)_2/KOH$, in which the discharge products, namely lead sulfate, cadmium and nickel hydroxide, respectively, are insoluble in the electrolyte. The opinion used to prevail that efficient secondary batteries must not contain any other type of electrode.

However, it has also already been disclosed to employ electrodes of the first kind in secondary batteries. In their case, the discharge product dissolves and during charging, is transported back from the solution to the electrode surface and is deposited there. The active materials are thus built up, and dissolved, as electrode layers. Examples of such electrodes are $Zn/K_2[Zn(OH)_4]$, $MnO_2/MnSO_4$, and Pb or $PbO_2/Pb(BF_4)_2$. The alkaline zinc/zincate electrode is used in practice in zinc/nickel oxide, zinc/silver oxide and zinc/air batteries.

$MnO_2$ dissolved-state electrodes together with acid zinc dissolved-state electrodes, in acid electrolytes, form a zinc/$MnO_2$ cell. The acid zinc dissolved-state electrode in acid electrolytes is also employed in the $Zn/PbO_2/H_2SO_4$ cell, which has been known for many years. The last-mentioned lead and lead dioxide electrodes are employed in the lead dissolved-state secondary battery wherein the electrolyte is, eg., perchloric acid, tetrafluoboric acid, hexafluosilicic acid or amidosulfonic acid.

Electrodes of the first kind have some basic advantages over the conventional electrodes of the second type, namely higher conversion of the active material, higher efficiency and improved low-temperature behavior. Thus, higher energy densities and output densities may be expected over a wide temperature range. However, in general, dissolved-state batteries cannot be operated without electrolyte circulation.

It is known that whilst the lead electrode in the lead dissolved-state cell exhibits almost ideal behavior, the lead dioxide electrode exhibits erreversible phenomena, especially during discharge. The phenomena in question are presented in a recent article (Ber. Bunsenges. 79, (1975), 133). This partial irreversibility of the $PbO_2$ electrode interferes, above all, on frequent cycling of a lead cell, ie. in the long-term behavior of the cell. At the end of the discharge phase, a residual oxide is left on the positive electrode base plate. The incomplete reduction of the $PbO_2$ layer also causes the oxide to slough during the discharge period. The oxide particles which accumulate on the bottom of the cell are of course also incapable of further cycling. In addition, the lead dioxide appears to corrode increasingly in the acid under cathodic load. All three effects together result in a loss in current efficiency, which manifests itself in an amount of residual lead, equivalent thereto, on the negative electrode base plate. According to this mechanism, a certain proportion of the lead ions is abstracted from the system, during each cycle, for forming the active composition, so that the number of achievable cycles is relatively low. A secondary battery, based on this system, which permits a large number of cycles is therefore only achievable if it proves possible substantially to repress these irreversible phenomena, which start from the lead dioxide.

It is an object of the present invention to provide a secondary battery which contains aqueous solutions of lead salts as the electrolyte and which can be cycled frequently without the above disadvantages.

We have found that this object is achieved if redox systems which have a standard potential of from −0.1 to +1.4 V relative to a standard hydrogen reference electrode are dissolved in the electrolyte, with the proviso that the redox systems do not form insoluble compounds with the electrolyte and are not oxidized or reduced irreversibly by the active material within their range of operating potentials.

The redox systems present in the electrolyte, in accordance with the invention, have a redox potential which is between the standard potential of lead — the active material on the negative side — namely $^{o}U_H = 0.13$ V, and the standard potential of lead dioxide — the active material on the positive side — of $^{o}U_H = 1.46$ V. Preferably, the redox systems have a standard potential of from +0.1 to 1.1 V relative to a standard hydrogen reference electrode. It is essential that the systems should not form insoluble compounds with the dissolved lead salts of the electrolytes or with the corresponding acids and that they should not be oxidized or reduced irreversibly by the active materials deposited on the electrode base plates during charging, ie. by the lead or lead dioxide, at the potentials in question.

Particularly suitable redox systems, and their standard potentials, are listed below:

| | |
|---|---|
| $V^{+++}/VO^{++}$ | (+0.36 V) |
| Durohydroquinone/duroquinone | (+0.48 V) |
| $U^{+++}/UO_2^{++}$ | (+0.62 V) |
| Hydroquinone/quinone | (+0.70 V) |
| $Fe^{++}/Fe^{+++}$ | (+0.77 V) |
| $NO_3^-/NO_2^-$ | (+0.94 V) |

Vanadium, uranium and iron are advantageously added to the electrolyte in the form of salts whereof the anion corresponds to the anion of the lead salt contained in the electrolyte. Nitrate/nitrite is advantageously added to the electrolyte in the form of sodium nitrite or $HNO_3$. The $Fe^{++}/Fe^{+++}$ redox system is particularly preferred.

It generally suffices to add one redox component, preferably the reduced form, to the solution, since a stationary state redox ratio is soon set up during operation of the battery.

The concentration of the redox components should in general be kept low in order to reduce the losses in current efficiency, and is from 0.1 to 100 mmole/liter, preferably from 1 to 30 mmole/liter.

It has furthermore proved advantageous to add a redox system not only to the electrolyte, but also to the inert electrode base plate on the positive side, ie. the electrode base plate on which the lead dioxide precipitates during charging; this latter redox system must be insoluble in the electrolyte and also has a potential of from −0.1 to +1.4 V, preferably from +0.1 to 1.1 V, relative to a standard hydrogen electrode. Suitable materials for this electrode base plate are titanium and also, above all, graphite, electrode carbon and graphite-filled plastics, ie. graphite particles embedded in binders which are resistant to the electrolyte. Examples of suitable binders are polypropylene, polyethylene and polyvinyl chloride. Advantageously the binder is filled with from 50 to 80% by weight of graphite. According to the invention, these electrode base plates can contain insoluble redox systems which can be incorporated as a filler into the electrode, but which must at the very least be present on the surface of the electrode. Suitable insoluble redox components are magnetite, iron-(III) oxide, iron phthalocyanine, vanadium-(III) oxide, uranium-(IV) oxide and polyhydroquinone.

The redox systems are incorporated into the electrode base plates in amounts of from 0.01 to 20% by weight, preferably from 0.1 to 3% by weight.

When using electrode base plates consisting of graphite-filled plastic, it is possible and advantageous to employ natural graphite, eg. natural graphite flakes with particle sizes of from 0.1 to 0.2 mm, which graphite contains about 1% by weight of iron and at the same time serves as the redox system.

The redox systems may be employed individually or in combination; for example, the electrolyte can contain a mixture of the redox systems $V^{+++}/V^{4+}$ and quinone/hydroquinone.

The remaining parameters do not differ from those conventionally encountered in dissolved-state lead cells. Accordingly, preferred lead salt solutions are aqueous solutions of lead tetrafluoborate, lead hexafluosilicate, lead perchlorate and lead amidosulfonate, employed individually or as mixtures. As a rule, the free acid is present in an excess of up to 100 mole% (in the discharged state). The salt concentrations are from not less than 20% by weight to the saturation concentration. Negative electrode base plates which may be employed are again the above graphite materials, and in addition acid-resistant metals, eg. copper, Monel metal, nickel alloys with molybdenum, chromium, manganese, copper, silicon or iron as alloy constituents, or acid-resistant steels containing chromium, nickel or molybdenum. In general, the electrodes have a smooth surface. However, for better adhesion of the active materials, in particular of the $PbO_2$, it is advantageous to provide a structured surface, eg. to use plates with milled grooves or pyramids, expanded metals, grids or sand-blasted plates. The wiring of the electrodes may be monopolar or, advantageously, bipolar. It is advantageous to circulate the electrolyte eg. by stirring or pumping, when charging and/or when discharging.

On charging, the conversion of the lead salt solutions is from 10 to 90%, preferably from 20 to 70%. The current densities on charging and discharging are from 0.5 to 25 $A/dm^2$ and preferably from 1 to 10 $A/dm^2$. It is advantageous to reduce the charging current density toward the end of the charge. The amount of charge per unit area is from 0.1 to 10 $Ad/dm^2$, preferably from 1 to 5 $Ah/dm^2$.

Surprisingly, the redox additives of the invention bring about a uniform cathodic dissolution of the lead dioxide in the battery. The irreversible phenomena, above all toward the end of the discharge, substantially do not occur. Only a little residual oxide remains on the electrode, without a tendency to accumulate. Similarly, the accumulation of lead on the counter-electrode is also greatly slowed down. The amount of oxide sludge is also very small.

Secondary batteries which contain the redox systems of the invention but which, after very long periods of cycling, are no longer usable due to the accumulation of irreversibly deposited material, can be regenerated simply and effectively in the presence of the redox systems. This is achieved by the following measures, which are employed individually or in combination:

a. Further circulation of the electrolyte, with the battery shorted. b. As in (a), but additionally accompanied by passing a slow finely divided stream of air through the battery. c. Reversing the polarity of the battery (during charging) at low current densities of from 0.01 to 0.2 $A/dm^2$, whilst continuing to circulate the electrolyte, and if appropriate whilst also passing air through the battery.

Without the redox system, the regeneration processes take place too slowly or may lead to destruction of the battery. For example, in method (c) lead may deposit on the positive electrode. With conventional batteries, these measures cannot be employed effectively, since, eg., active material which has come off the plates cannot redissolve. Accordingly, the battery of the invention is not only distinguished by a long cycle life, but can also be regenerated in a simple manner and thus has a practically unlimited life.

FIG. 4 is a graph summarizing the potential-time curves obtained for different electrolytes in yet another example.

EXAMPLE 1

Figures 1, 1A:
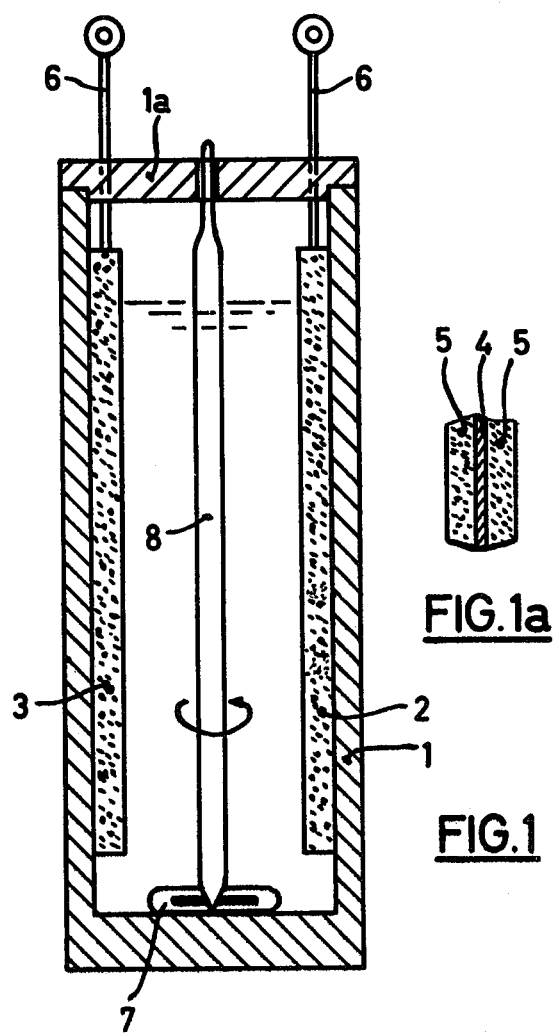
FIG. 1 shows a two-electrode cell used in the secondary battery according to a first example of the present invention.
FIG. 1a shows the electrode structure, drawn to an enlarged scale, of the cell of FIG. 1.

A. The box-shaped cell 1 shown in FIG. 1 consists of polymethyl methacrylate and is closed with a cover 1a. Two rectangular electrode base plates 2 and 3 of graphite-filled plastic stand in the cell, in guide grooves, 25 mm from one another. The clearance from the bottom is about 10 mm to prevent shorting due to active composition which has fallen to the bottom. The electrodes consist of a 1 mm thick roughened sheet brass inner layer 4, (FIG. 1a, over which a 3 mm thick layer 5 of graphite-filled plastic has been molded, on all sides, in an appropriate mold in a heated press at 190° C and 10 atmospheres. This filled plastic consists of 20% by weight of polypropylene and 80% by weight of natural graphite in the form of flakes having a particle size distribution in accordance with DIN 4,188, with at least 70% retention on an 0.16 mm sieve. The natural graphite, in turn, comprises from 93 to 95% by weight of (pure) graphite and from 5 to 7% by weight of ash. The ash essentially consists of $SiO_2$ and $Al_2O_3$, but a total of 1.12% by weight of iron, based on natural graphite, is also present, of which 0.47% by weight of iron is in an insoluble form. The surface of the electrode which faces the electrolyte is uniformly roughened by sand-blasting. Current is fed in through brass connections 6 which are protected with an acid-resistant reactively curing surface coating and which pass through the cover. The electrolyte is stirred by means of a small bar magnet stirrer 7. For greater efficiency, an 8 mm wide polypropylene strip 8 is attached to the said magnet, a bearing for the other end being provided in the cover. During cycling, this device rotates at about 100 rpm.

Figure 2:
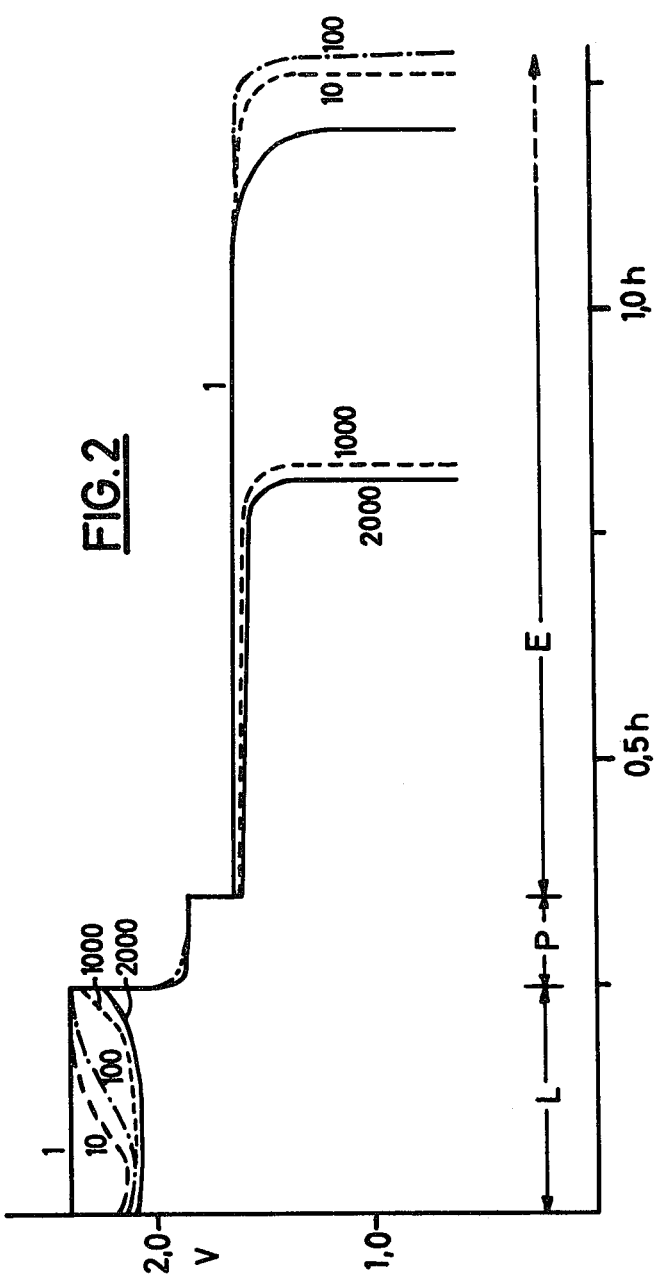
FIG. 2 is a graph showing the variation in charge voltage and discharge voltage for different cycles.

The cell is filled with 205 ml of an aqueous solution which contains 1 mole/liter of $Pb(BF_4)_2$, 1 mole/liter of free $HBF_4$ and 1.7 mmoles/liter of $Fe(BF_4)_2$. The immersed area of the electrode base plate is 67 cm². Charging is carried out at 2.67 A, corresponding to a current density of 4 A/dm². The charge time is 15 minutes. The theoretical amount of current per unit area is 1.0 Ah/dm². The theoretical conversion of lead in the solution is 12%. After charging, 5 minutes are allowed to elapse before the battery is discharged at 0.67 A (after 150 cycles with 1.33 A), corresponding to a discharge current density of 1 and 2 A/dm², respectively. After reaching a final discharge voltage of 0.8 V, the system is again switched over to charge. The electrolyte is at 20°–25° C. The lead layers deposited are smooth and free from dendrites and adhere well. The charge voltage is initially 2.45 volt but drops to a mean value of 2.15 volt after only a few cycles. FIG. 2 shows the variation in the charge voltage and discharge voltage (a) during the 1st cycle (solid curve), (b) during the 10th cycle (dashed curve), (c) during the 100th cycle (dot-dash curve), (d) during the 1,000th cycle (lower dashed curve) and (e) during the 2,000th cycle (lower solid curve). The intervals marked in the lower part of the figure denote: L = charge, P = pause and E = discharge. The off-load voltage is 1.85 volt in each case. The discharge curve shows the ideal horizontal shape; the discharge voltage is 1.6–1.65 volt and shows virtually no change in the course of cycling (FIG. 2). Toward the end of the second to tenth discharge period it is noted that a small amount of residual oxide falls off the positive electrode. However, after the tenth cycle the total amount shows no further increase. On the contrary, in the course of further cycling, the amount of precipitate again decreases, and after about 200 cycles the precipitate has disappeared completely. The solution then remains constantly clear and colorless. From the discharge time, the Ah efficiency is calculated to be 90–95%, and shows no tendency to decrease during cycling (FIG. 2). The Wh efficiency has a mean value of 65–70%.

After a cycling time of more than 2,000 hours, the experiment is discontinued after 2,069 complete cycles. The negative electrode base plate is covered with a smooth layer of 1.3 g of residual lead. The positive electrode base plate is coated with a black-brown layer of 5.6 g of residual oxide, which adheres firmly. The electrolyte is found to contain 34.5 g of lead ($c = 0.81$ mole/liter). The amounts of lead balance to 96%.

B. A comparative Experiment is carried out under the same conditions except that the electrode base plates in this case consist of iron-free synthetic graphite. The electrolyte also contains no iron. The surface of the positive electrode is structured by milling a pyramid pattern, to improve the adhesion of the oxide. Contacts are made via screwed-in brass leads. When cycling this cell, about the same Ah and Wh efficiencies are achieved, but the mean charge voltage tends to rise. However, after 87 cycles the experiment has to be discontinued. At this point, the lead ion concentration has fallen to about 0.1 mole/liter, so that on charging excessive formation of spongy lead on the negative electrode, and of gases on both electrodes, is observed, and at the same time the battery capacity drops precipitously. At the end of this experiment, the lead balance presents the following picture:

| | | |
|---|---|---|
| Residual oxide, adhering | 4.7 g = | 4.1 g of Pb |
| Residual oxide, fallen off | 7.3 g = | 6.3 g of Pb |
| Residual lead on the negative electrode | 23.8 g | |
| Lead ions in solution | 4.9 g | (0.116 M) |
| Σ Lead | 39.1 g | 92.5% of theory |

The number of possible cycles proves to be highly dependent on the conversion of the lead salts solutions during charging. In each case, if the electrode base plate consisting of graphite-filled polypropylene containing iron is used, in the presence of 1.7 mmoles/liter of $Fe^{++}$, the number of cycles achievable is substantially better than when using the iron-free system with electrodes of synthetic graphite. At the lower conversions, the difference is about two orders of magnitude. The results are summarized in Table 1.

TABLE 1

| Conversion of the electrolyte (%) | $L_{QA} \left[ \dfrac{Ah}{dm^2} \right]$ | Charge time, mins. | Number of cycles achieved Example A | Example B |
|---|---|---|---|---|
| 12 | 1.0 | 15 | >2,069+ | 87 |
| 16 | 1.33 | 20 | >1,800+ | — |
| 20 | 1.67 | 25 | >1,237+ | 30 |
| 30 | 2.5 | 37.5 | 46 | 12 |
| 50 | 4.2 | 62.5 | 25 | 6 |

+Experiment discontinued.

C. To exclude the effect of the structure of the electrode base plate, a Comparative Experiment is carried out with a graphitefilled polypropylene electrode of the same composition as in Example A, but using purified, iron-free graphite,. After sandblasting, the electrode is cleaned further by immersing it for three days in 18% strength by weight aqueous hydrochloric acid, which is changed twice. The current conversion in the cycling experiment is 30%. The remaining parameters correspond to those of Example A, except that the electrolyte does not contain any iron ions. Table 2 summarizes the results, together with results from an experiment with an electrode containing iron (Example A).

TABLE 2

| | Graphite-filled PP electrode with iron-free graphite Example 1 C | Graphite-filled PP electrode with iron-containing natural graphite Example 1 A |
|---|---|---|
| Cycles achieved at 30% conversion | 8 | 46 |
| Lead balance: | | |
| $PbO_2$ adhering (g) | 10.5 | 0.85 |
| $PbO_2$ fallen off (g) | 16.6 | 7.4 |
| Lead adhering (g) | 18.9 | 27.3 |
| Lead in solution (g) | 2.9 | 7.5 |
| Total lead, % of theory | 107% | 99% |

In spite of the same structure being used, far fewer cycles are achievable in the experiment with the iron-free electrode, in the absence of $Fe^{++}$, than in the experiment with the electrode containing iron. The number of cycles achieved with the iron-free electrode corresponds roughly to that achieved with the synthetic graphite at 30% conversion, compare Example 1B.

EXAMPLE 2

Figure 3:
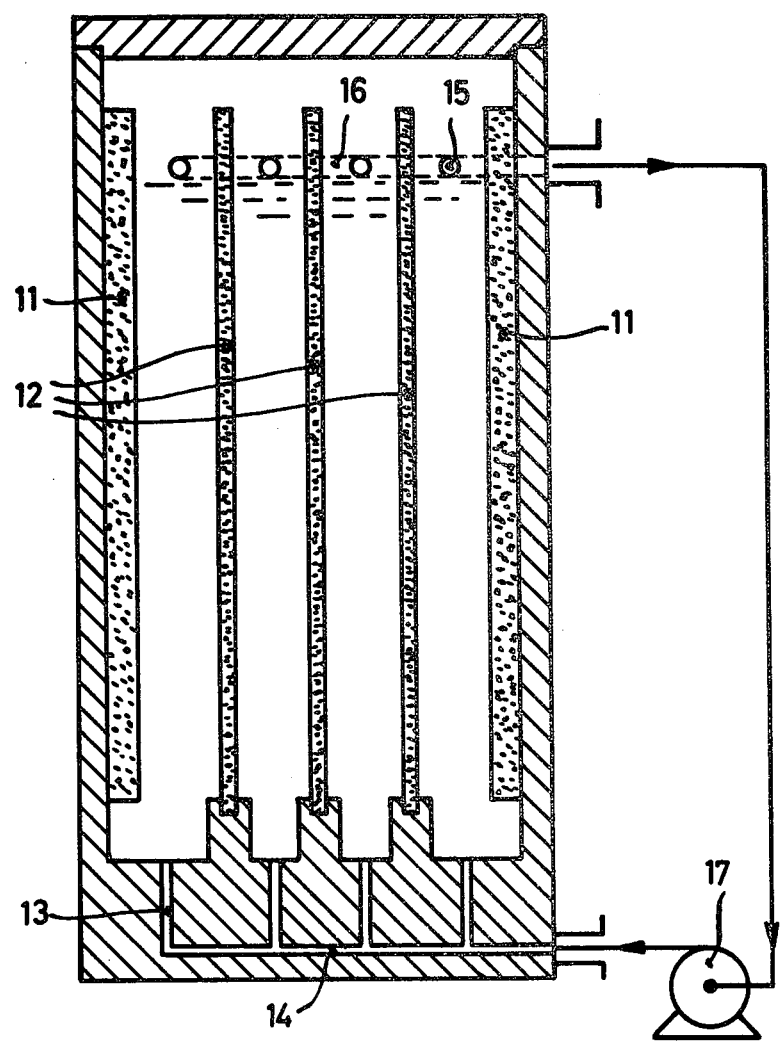
FIG. 3 shows a multi-electrode cell used in the secondary battery according to a second example of the invention.

In this experiment, using the apparatus shown in FIG. 3, a somewhat larger box cell is employed, which in addition to the two end electrodes with brass inner layers, 11, as used in Example 1, also contains three bipolar electrodes 12 of 3 mm thick sheets of polypropylene, filled with natural graphite, which have been sandblasted on both sides.

These bipolar electrodes are glued into position between the end electrodes, at intervals of 20 mm. The chambers formed must be fluid-tight since otherwise losses due to stray currents become noticeable. The electrolyte is pumped in through holes 13 in the bottom of the cell, which are connected to a manifold 14, and returns via side channels 15 and the manifold 16. The length and crosssection of the feed lines 13 and discharge lines 15 must be such that losses due to stray currents are restricted to a minimum. A small centrifugal pump 17 slowly circulates the electrolyte at 15 liters/hr. At the start of cycling, the system is filled with 820 ml of a solution of 1 mole/liter of $Pb(BF_4)$, 1 mole of $HBF_4$ and 1.7 mmole/liter of $Fe(BF_4)_2$, and is charged at 4A/$dm^2$ for 25 minutes, corresponding to a conversion of 20% and a charge density of 1.67 Ah/$dm^2$. The residual oxide precipitate formed during the first cycles later redissolves completely. On the 85th cycle, the discharge current density is raised to 2 A/$dm^2$. The mean charge voltage of 8.5 volt and the mean discharge voltage of 6.5 volt are remarkably constant and correspond to the values for the monocell in Example 1. The discharge curve does not show a step and the individual cells show substantially identical behavior. The Ah efficiency of 84–86% is very constant, and gives Wh efficiencies of 64%. After 609 cycles, the Ah efficiency decreases within a few cycles, to low values, and evolution of gas is observed during charge. At this point in time, the lead ion concentration has fallen to about 0.1 mole/liter.

After the 103rd charge, the battery is left standing in the charged state. Cycling is resumed after 250 hours. The 103rd discharge in that case gives a 68% Ah efficiency, i.e. 80% of the normal capacity.

EXAMPLE 3

The cell described in Example 1A is cycled under the conditions described there, but at a conversion of 30% ($^LQ_A$ = 2.5 Ah/$dm^2$). The electrolyte contains 5 mmole/liter of $Fe(BF_4)_2$. 157 cycles are achieved, with a mean Ah efficiency of 82%. If the cell is cycled under identical conditions, but using an iron-free graphite electrode, as described in Example 1C, only 46 cycles are achieved, whilst in a system which is also cycled under identical conditions, but with iron absent from the electrolyte, only from 8 to 12 cycles are achieved, with the same mean Ah efficiency. If, thereafter, the electrolyte is stirred for a further 40 hours, with the electrodes shorted, and whilst passing a slot stream of air through the cell, substantial regeneration of the cell is achieved, with complete dissolution of the residual lead, and normal operation of the cell can be continued.

Table 3 below gives the results of further experiments with different conversions, concentrations and redox systems.

TABLE 3

| Electrolyte conversion | mmole/liter | Redox component | Number of cycles achieved | Ah efficiency |
|---|---|---|---|---|
| 30% | 5 mmole/l | $Fe^{++}$ | 157 | 82 |
| 30% | 10 mmole/l | $Fe^{++}$ | 196 | 69 |
| 30% | 25 mmole/l | $Fe^{++}$ | 400 | 64 |
| 30% | 100 mmole/l | $Fe^{++}$ | 50 (discontinued) | 47 |
| 50% | 5 mmole/l | $Fe^{++}$ | 45 | 83 |
| 50% | 25 mmole/l | $Fe^{++}$ | 112 | 62 |
| 30% | 10 mmole/l | $V^{+++}$ | 167 | 81 |
| 30% | 10 mmole/l | Hydroquinone | 188 | 71–81 |

As expected, the Ah efficiencies decrease with increasing concentration of the redox system. In the last-mentioned experiment, with added hydroquinone, a stationary yellow coloration, due to quinhydrone formation, is set up in the course of the first few cycles, but the coloration later decreases. The Ah efficiencies rise progressively from 71 to 81%.

EXAMPLE 4

The cell according to Example 1 contains 205 ml of a solution which contains 2 moles/liter of $Pb(BF_4)_2$, 1.7 mmoles/liter of $Fe(BF_4)_2$ and 1 mole/liter of $HBF_4$. During charge, the solution undergoes 40% conversion, corresponding to a charge time of 1 hour and 39 minutes and a high charge density of 6.6 Ah/$dm^2$. The charge current density is 4 A/$dm^2$ and the discharge current density if 1 A/$dm^2$ initially and, after the 7th cycle, 2 A/$dm^2$. The remaining conditions are as described in Example 1A.

The layers deposited during cycling are smooth and adhere firmly. The Ah efficiency is 92–95% and the Wh efficiency about 68%. 61 cycles are achieved. At the end of this period, 67% of the lead are deposited on the negative electrode, 10% have fallen off as residual oxide sludge, 5% are still present in the electrolyte and the remainder is present as firmly adhering residual oxide on the positive electrode.

The cell is regenerated as follows: the polarity of the cell is reversed, the electrolyte is stirred and the cell is subjected to 0.2 A/$dm^2$ for about 2 days. After this time, the residual lead has dissolved completely and the residual oxides have dissolved substantially. No lead is deposited on the positive electrode.

EXAMPLE 5

A relatively close electrode spacing of 3.5 mm is set up in a plate and frame cell. A relatively high conversion of 65% can be achieved in this way at a relatively low charge density of 2 Ah/$dm^2$. The electrolyte which contains 2 moles/liter of $Pb(BF_4)_2$, 1 mole/liter of $HBF_4$ and 1.7 mmoles/liter of $Fe(BF_4)_2$, is slowly circulated by pumping. The electrodes and current densities are as described in Example 1A. The means Ah efficiency is 85%. 275 cycles are achieved.

EXAMPLE 6

This example describes a simple method of measurement by means of which the effectiveness of redox additives when depositing $PbO_2$ can be tested.

A platinum cylinder (A = 2 $cm^2$), against which the electrolyte, which consists of an aqueous solution which contains 1 mole/liter of $Pb(BF_4)_2$ and 1 mole/liter of $HBF_4$, impinges axially is polarized anodically with a current density of 2 A/$dm^2$. After 30 minutes, the current is reversed and the $PbO_2$ layer is reduced cathodically. The electrode potential relative to an Hg(I) sulfate electrode (potential $U_s$) is recorded. After reaching a potential of $U_s$ = 0.6 volt, the platinum cylinder is again anodically polarized, etc. The conversion of the electrolyte during this measure is <1%.

FIG. 4 summarizes some potential-time curves, with the solid curves illustrating the results obtained with the electrolyte described above, whilst the broken curves represent the results achieved with the electrolyte containing Fe(BF$_4$)$_2$ referred to below. In the base electrolyte, a black-brown residual oxide is found to remain on the electrode even at the end of the first discharge. During the second charge, the PbO$_2$ is first deposited on the residual oxide, which results in a potential trough. The reproducibility of the shape of the curve is poor, since some of the residual oxide flakes off.

On the other hand, in the presence of 25 mmoles/liter of Fe(BF$_4$)$_2$, the lead dioxide has dissolved completely by the end of the first discharge. Virtually no potential trough is observed during the next charge, and even after sustained cycling, no residual oxide is found to have fallen off. Table 4 summarizes these and other results

TABLE 4

Cycling at 2 A/dm$^2$/Pt
Charging time 0.5 h, i.e. 1 Ah/dm$^2$

| Redox component | Length of potential trough Ah/dm$^2$ | Mean Ah efficiency % |
|---|---|---|
| None | 0.3 – 0.6 | 85 – 90 |
| 5 mmole/l Fe$^{++}$ | 0.08 | 86 |
| 25 mmole/l Fe$^{++}$ | 0.06 | 65 |
| 25 mmole/l V$^{+++}$ | 0.05 | 74 |
| 25 mmole/l U$^{++++}$ | 0.12 | 82 |
| 25 mmole/l NO$_2{}^-$ | 0.04 | 86 |
| 5 mmole/l Quinhydrone | 0.04 | 58 |
| 25 mmole/l Hydroquinone | 0.03 | 42 |

We claim:

1. A secondary battery having inert electrode base plates and employing as electrolyte an aqueous acid solution of a lead salt containing, dissolved therein, a redox system which has a standard potential of from −0.1 to +1.4 V relative to a standard hydrogen reference electrode and which does not form insoluble compounds with the remaining electrolyte constituents and is not oxidized or reduced irreversibly by active materials on the electrode base plate in the range of the operating potential of the redox system.

2. A secondary battery as set forth in claim 1 wherein the redox system has a standard potential of from +0.1 to +1.1 V relative to a standard hydrogen electrode.

3. A secondary battery as set forth in claim 1 wherein the electrolyte contains from 0.1 to 100 mmoles of the redox components per liter.

4. A secondary battery as set forth in claim 1 wherein the electrolyte contains from 1 to 30 mmoles of the redox components per liter.

5. A secondary battery as set forth in claim 1 wherein the electrolyte contains aqueous solutions of lead salts of perchloric acid, tetrafluoboric acid, hexafluosilicic acid and/or amidosulfonic acid.

6. A secondary battery as claimed in claim 1 wherein the electrode base plate for the positive electrode consists of graphite or graphite-filled plastic.

7. A secondary battery as set forth in claim 6 wherein the electrode base plate contains an insoluble redox component in an amount of from 0.01 to 20% by weight and the redox system has a standard potential of from −0.1 to +1.4 V relative to a standard hydrogen electrode.

8. A secondary battery as set forth in claim 7 wherein the electrode base plate contains as the insoluble redox component magnetite, iron-(III) oxide, iron phthalocyanine, vanadium-(III) oxide, uranium-(IV) oxide or polyhydroquinone.

* * * * *